United States Patent [19]
McClendon

[11] 4,108,311
[45] Aug. 22, 1978

[54] SAFETY WARNING KIT

[76] Inventor: Gilbert McClendon, 1540 N. Carey St., Baltimore, Md. 21217

[21] Appl. No.: 795,741

[22] Filed: May 11, 1977

[51] Int. Cl.² .......................................... B65D 79/00
[52] U.S. Cl. .................................. 206/573; 116/173; 206/803; 246/488
[58] Field of Search ............... 206/573, 216; 116/273, 116/274, 63 P; 246/488; 40/124.1, 125 H

[56] References Cited
U.S. PATENT DOCUMENTS

| | | | |
|---|---|---|---|
| 1,695,052 | 12/1928 | McMurray | 246/488 |
| 2,557,859 | 6/1951 | Bernstein | 116/173 |
| 2,909,147 | 10/1959 | Crowder | 116/173 |
| 3,997,993 | 12/1976 | Flaherty | 116/174 |

Primary Examiner—William T. Dixson, Jr.
Attorney, Agent, or Firm—John F. McClellan, Sr.

[57] ABSTRACT

A highway safety warning kit having a portable all inclusive container, a display pole fitted thereto and a plurality of displayable safety warning signs.

10 Claims, 5 Drawing Figures

SAFETY WARNING KIT

BACKGROUND OF THE INVENTION

1. Field of the Invention

This invention relates to sign kits and, in particular, to highway safety warnings.

2. Description of the Prior Art

Many sign kits have been known. In particular, a number of highway warning message devices have been disclosed.

Amongst these is Larimer's disclosure in U.S. Pat. No. 3,741,382 of a multiple purpose container and warning sign kit.

OBJECTS

It is therefore an object of this invention to overcome the limitations and disadvantages in the safety warning devices in the prior art and currently available in the market.

One of the objects of the invention is to provide a safety warning device embodying improved principles of design and construction.

An important object of the invention is to provide a safety warning device which is comprised of a number of simple durable parts or components which can be economically manufactured and readily assembled.

A significant object of the invention is to provide a safety warning device, so designed and constructed that it can be easily assembled and applied by almost any typical driver.

Another object of the invention is to provide a self-contained warning unit.

A further object of the invention is to provide a selective series of warning signs.

Yet another object of the invention is to provide a ready and secure display for the signs.

A still further object of the invention is to provide a container for holding all the parts and making the kit both portable and stowable.

SUMMARY

A safety warning kit according to the principles of this invention, comprises a container, a cover, a post fittable into suitable openings in the cover and the container, signs having fastening means for attaching to the post, highway fuses.

Further objects and advantages of this invention will appear more clearly from the following description of a nonlimiting illustrative embodiment and the accompanying drawings in which like numerals designate like parts throughout the several views.

DESCRIPTION OF THE DRAWINGS

Briefly summarized, a preferred embodiment of the invention is described in conjunction with an illustrative disclosure thereof in the accompanying drawings, in which.

DESCRIPTION OF THE TYPICAL EMBODIMENT

Figure 1:
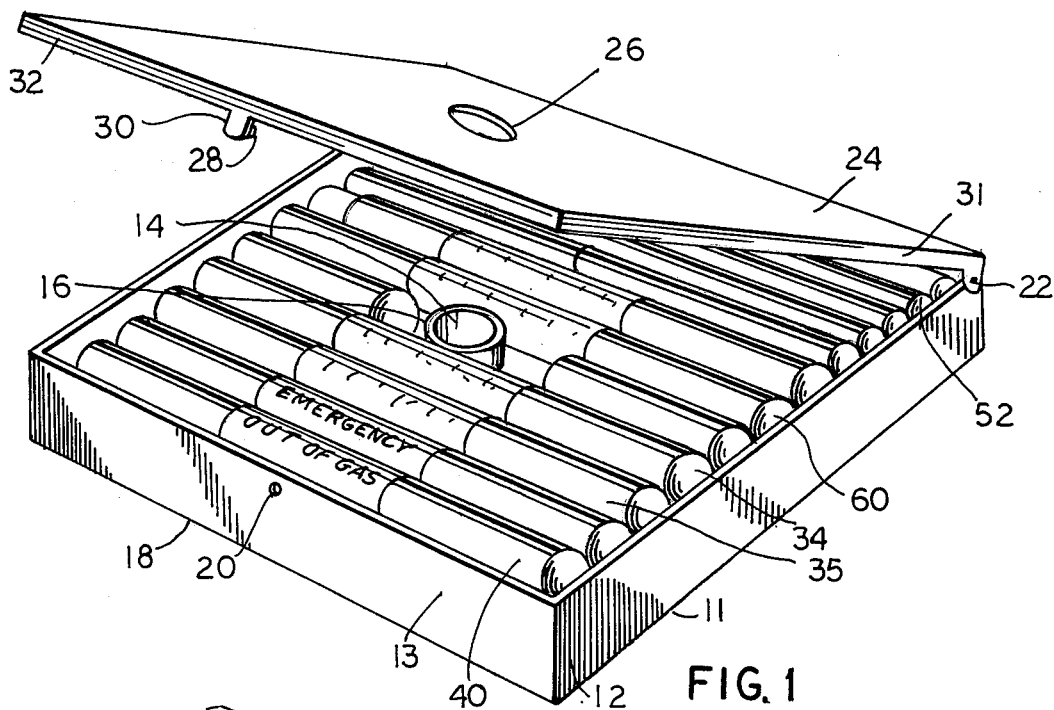
FIG. 1 is a pictorial representation of the safety warning kit according to the principles of this invention.
Figure 2:
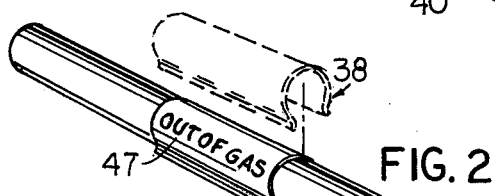
FIG. 2 is a pictorial representation of an individual rolled up sign showing its label and an optional retaining clip.
Figure 3:
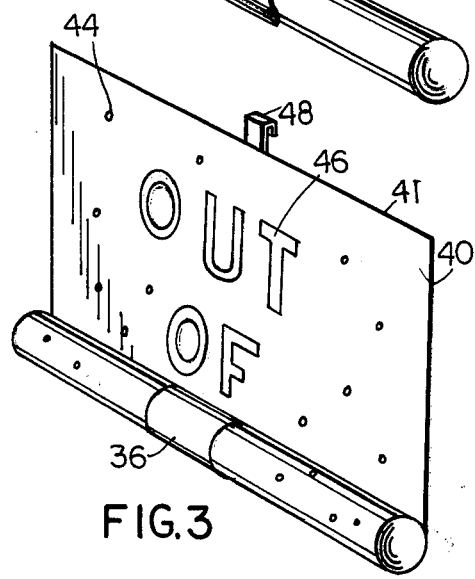
FIG. 3 illustrates an individual sign being unrolled.
Figures 4, 5:
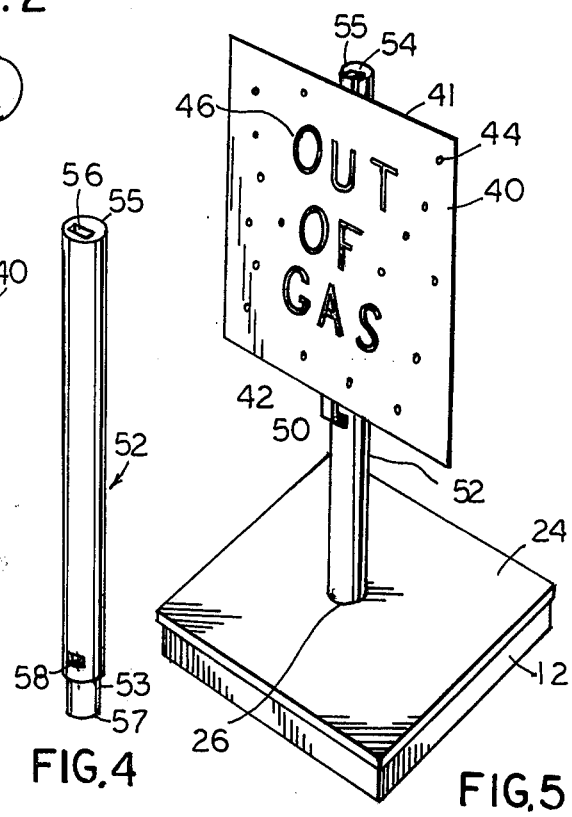
FIG. 4 shows the post.
FIG. 5 shows the safety warning kit in use with a sign fully displayed.

In the drawings a highway safety warning kit embodying features of the invention is illustrated having a container 11 with a fitted cover 24 having a hole 26 to align with hole 14 or hollow post 16 so as to firmly hold post 52 when end 53 is fitted therein.

The container 11 with sides 12, 13 and so on may be fitted to sides 31, 32, etc., of cover 24 or the cover may be attached to the container 11 as by a hinge 22 or other known device.

The container 11 may be used to hold a plurality of signs 34, 35, 40, a post 52, highway fuses 60 for safety flares and other equipment as desired.

A latch 30 with point 28 to engage hole 20 may be provided. More elaborate latches may be used including security features.

The signs 40, etc., when rolled up may have a convenient label 47 to indicate the nature of the message on the sign.

Retaining clip 38 may be used to maintain the sign in a rolled up condition. The sign 40 may be made of weather resistant material such as impregnated fabric, plastic, or sheet metal and may be perforated with many holes 44 to reduce wind resistance.

The message 46 may be made of translucent material to permit rear illumination. At each end of the sign 40 fasteners 48, 50 are provided to engage into openings 56, 58 in the end 55 and along the length of post 52, which may even be hollow. The reduced post diameter 53 fits into holes 26, 14 and limits the descent of the post 52.

A prestressed steel spring strip 36 may be attached to the sign 40 and may be used to either roll up or extend the sign.

When the container is resting upon its bottom 18 on a surface such as the ground and the post 52 has been erected, the sign 40 may be well displayed in a stable position.

One of the advantages of the invention is to provide a safety warning device embodying improved principles of design and construction.

An important advantage of the invention is to provide a safety warning device which is comprised of a number of simple durable parts or components which can be economically manufactured and readily assembled.

A significant advantage of the invention is to provide a safety warning device, so designed and constructed that it can be easily assembled and applied by almost any typical driver.

Another advantage of the invention is to provide a self-contained warning unit.

A further advantage of the invention is to provide a selective series of warning signs.

Yet another advantage of the invention is to provide a ready and secure display for the signs.

A still further advantage of the invention is to provide a container for holding all the parts and making the kit both portable and stowable.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

I claim:

1. A highway safety warning kit comprising:
   a. a container having a body and a cover fitted thereto, the cover defining a thru hole centrally thereof, and the body providing an opening aligned with the hole,
   b. a long post which may be fitted into the hole and the opening, the post defining a first opening adjacent one end thereof and a second opening somewhere along the length of the post, and
   c. at least one sign comprising a rolled up flat extension spring and attached therealong a flat flexible material having at least four edges, adjacent a first edge of which is provided with a first fastening means, and adjacent a second, distal edge of which is provided a second fastening means, all said fastening means engaging the respective openings in the post, the combination of the post erected into the container and the sign attached to the post thereby displaying the sign.

2. A kit as in claim 1 wherein the combination further comprises a retaining clip for holding said flat extension spring and flat flexible material in rolled-up configuration for storage in said container.

3. A kit as in claim 1, a plurality of said signs, each decorated with a message, and wherein said post is hollow and the first opening comprises an opening in the end of said hollow post.

4. A kit as in claim 3 wherein each sign further includes a label for indicating the message when rolled up, and said post having a reduced diameter section for fitting into said hole for limiting descent of said post.

5. A kit as in claim 4 wherein the sign comprises perforate weather resistant material.

6. A kit as in claim 5 wherein the sign further comprises translucent material for the message.

7. A kit as in claim 6 wherein a said label appears on each retaining clip.

8. A kit as in claim 7 wherein the container further comprises a latch with a point and hole relation.

9. A kit as in claim 8 wherein the cover is hingedly attached to the container.

10. A kit as in claim 9 further comprising highway fusees as an emergency warning light source.

* * * * *